(12) United States Patent
Thakkar

(10) Patent No.: US 8,874,802 B2
(45) Date of Patent: Oct. 28, 2014

(54) SYSTEM AND METHOD FOR REDUCING COMMUNICATION OVERHEAD BETWEEN NETWORK INTERFACE CONTROLLERS AND VIRTUAL MACHINES

(71) Applicant: VMware, Inc., Palo Alto, CA (US)

(72) Inventor: Pankaj Thakkar, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/163,698

(22) Filed: Jan. 24, 2014

(65) Prior Publication Data

US 2014/0143366 A1    May 22, 2014

Related U.S. Application Data

(62) Division of application No. 12/211,000, filed on Sep. 15, 2008, now Pat. No. 8,667,187.

(51) Int. Cl.
| | | |
|---|---|---|
| *G06F 13/28* | (2006.01) | |
| *G06F 13/24* | (2006.01) | |
| *H04L 29/08* | (2006.01) | |
| *G06F 13/38* | (2006.01) | |
| *G06F 9/455* | (2006.01) | |

(52) U.S. Cl.
CPC .. *H04L 67/1097* (2013.01); *G06F 2009/45583* (2013.01); *G06F 9/45558* (2013.01); *G06F 13/24* (2013.01); *G06F 13/28* (2013.01); *G06F 9/45533* (2013.01); *G06F 13/385* (2013.01)
USPC .................................................. 710/22; 711/6

(58) Field of Classification Search
None
See application file for complete search history.

(56) References Cited

U.S. PATENT DOCUMENTS

| | | | |
|---|---|---|---|
| 6,078,973 A | 6/2000 | Klein | |
| 6,182,165 B1 | 1/2001 | Spilo | |
| 6,327,615 B1 | 12/2001 | Kasper | |
| 6,785,886 B1* | 8/2004 | Lim et al. ........................... | 718/1 |
| 6,910,118 B2 | 6/2005 | Kagawa | |
| 6,961,941 B1 | 11/2005 | Nelson et al. | |
| 7,461,180 B2 | 12/2008 | Lee et al. | |
| 2006/0010314 A1 | 1/2006 | Xu | |
| 2006/0080479 A1 | 4/2006 | Anjo et al. | |
| 2006/0277357 A1 | 12/2006 | Regnier | |
| 2006/0294519 A1* | 12/2006 | Hattori et al. ..................... | 718/1 |
| 2007/0067435 A1* | 3/2007 | Landis et al. ................. | 709/224 |
| 2007/0089111 A1* | 4/2007 | Robinson et al. ................. | 718/1 |
| 2007/0244972 A1 | 10/2007 | Fan | |
| 2008/0298274 A1 | 12/2008 | Takashige et al. | |
| 2009/0300434 A1 | 12/2009 | Gollub et al. | |
| 2009/0328074 A1* | 12/2009 | Oshins .......................... | 719/321 |
| 2010/0014526 A1* | 1/2010 | Chavan et al. ........... | 370/395.53 |
| 2010/0070677 A1 | 3/2010 | Thakkar | |
| 2013/0138758 A1* | 5/2013 | Cohen et al. .................. | 709/212 |

* cited by examiner

*Primary Examiner* — Elias Mamo

(57) ABSTRACT

Available buffers in the memory space of a guest operating system of a virtual machine are provided to a network interface controller (NIC) for use during direct memory access (DMA) and the guest operating system is notified accordingly when data is written into such available buffers. These capabilities obviate the requirement of using hypervisor memory as a staging area to determine which virtual machine to forward incoming data.

21 Claims, 15 Drawing Sheets

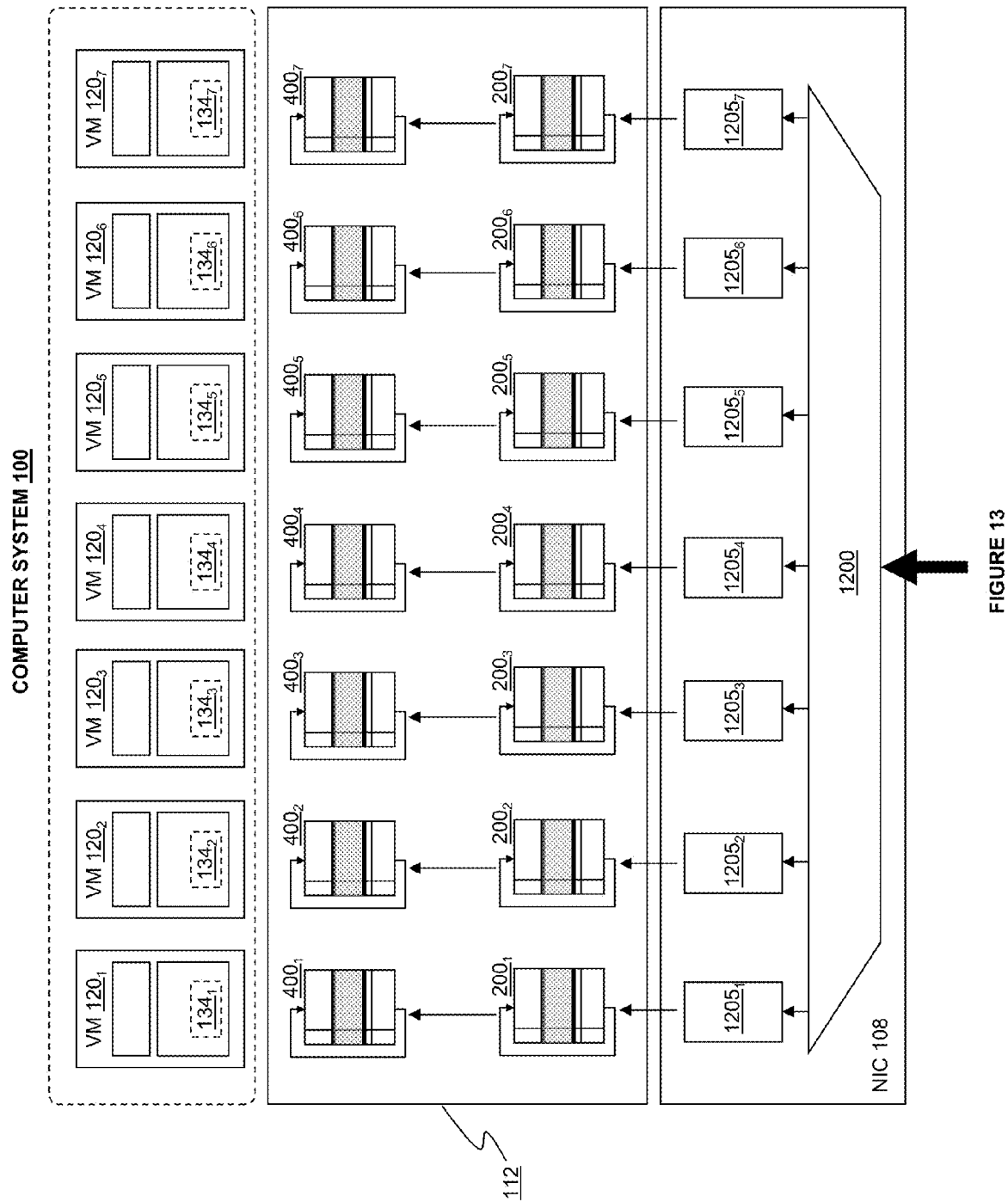

| MEMORY SPACE WHERE DATA WAS WRITTEN | OWNERSHIP OF DESCRIPTOR POINTED TO BY POINTER 408 | COURSE OF ACTION TAKEN BY HYPERVISOR |
|---|---|---|
| Guest Operating System Memory Space 424 (step 806) | NIC 108 (i.e., "in use" by the hypervisor) | 1400 "Zero-Copy" Scenario (Figures 7 through 12).<br><br>Perform steps 910 to 916, including step 1220 for intermediate table embodiments. |
| | Hypervisor 112 (i.e., not "in use" by the hypervisor) | 1405 "Zero-Copy" Scenario (Figures 7 through 12).<br><br>Perform steps 910 to 916, including steps 1215 and 1220 for intermediate table embodiments.<br><br>Alternate course of action: Copy the data from the buffer into the current address of the descriptor similar to step 510. |
| | Guest Operating System 132 | 1410 Descriptor ring 400 is full.<br><br>Drop the data packet. |

FIGURE 14A

| MEMORY SPACE WHERE DATA WAS WRITTEN | OWNERSHIP OF DESCRIPTOR POINTED TO BY POINTER 408 | COURSE OF ACTION TAKEN BY HYPERVISOR |
|---|---|---|
| Hypervisor Memory Space 224 (Step 306) | NIC 108 (i.e., "in use" by the hypervisor) | 1415 Inter-VM Communication. Take a free buffer address from intermediate list 1100, copy the address into the descriptor and copy the data in the buffer into this address, similar to step 510. |
| | Hypervisor 112 (i.e., not "in use" by the hypervisor) | 1420 Inter-VM Communication. Copy the data from the buffer into the current address of the descriptor, similar to step 510. |
| | Guest Operating System 132 | 1425 Inter-VM Communication where descriptor ring 400 is full. Drop the data packet. |

SYSTEM AND METHOD FOR REDUCING COMMUNICATION OVERHEAD BETWEEN NETWORK INTERFACE CONTROLLERS AND VIRTUAL MACHINES

CROSS-REFERENCE TO RELATED APPLICATIONS

This application is a divisional of U.S. patent application Ser. No. 12/211,000, filed Sep. 15, 2008, entitled "System and Method for Reducing Communication Overhead Between Network Interface Controllers and Virtual Machines", which is incorporated by reference in its entirety for all purposes.

BACKGROUND OF THE INVENTION

In a virtualized computer system, a virtualization software layer, often referred to as a hypervisor, is installed on top of the hardware layer of the computer system to coordinate use of limited hardware resources for a number of virtual machines that may be instantiated on the computer system. A NIC (network interface controller) is one example of a limited hardware resource. A component of the hypervisor includes a device driver that communicates with the NIC to send and receive data to and from a connected network.

The device driver and NIC employ a set of buffers to which the NIC writes data using DMA (direct memory access) and a ring data structure to manage the buffers. The ring data structure is typically a circular queue of records, referred to herein as descriptors, which contain the buffers' addresses and additional state information. The ring is accessed through a consumer pointer, which is used by the NIC to find an available buffer to write data, and a producer pointer, which is used by the hypervisor to add new buffer addresses for use by the NIC. The set of available buffers is located in the hypervisor's memory space and serves as a staging area for incoming data so that the hypervisor is able to examine data written into the buffers by the NIC and identify the virtual machine to forward the data.

For each virtual machine executing on top of the hypervisor layer, the hypervisor also implements a virtual NIC through which it forwards network data intended for a guest operating system running in the virtual machine. From the perspective of the guest operating system, the virtual NIC acts like a hardware NIC, interacting with a NIC device driver in the guest operating system to receive and transmit data. Once the hypervisor identifies the virtual machine that is the intended recipient of incoming data, it copies the data into the memory space of the recipient virtual machine, simulating a DMA process by the virtual NIC. This copying of data from buffers in hypervisor memory to buffers in virtual machine memory is a significant source of processing overhead.

SUMMARY OF THE INVENTION

One or more embodiments of the invention provide methods and systems for coordinating the usage of buffers in virtual machine memory by a NIC (referred to herein generally as "zero-copy" techniques). Such a capability obviates the requirement of using hypervisor memory as a staging area to determine which virtual machine to forward data to and reduces memory requirements of the hypervisor as well as processing overhead.

One method, according to an embodiment of the invention, forwards data received at a computer system from a NIC to a virtual machine. The method comprises receiving the data by the NIC, identifying an available buffer address in a memory space of a guest operating system of the virtual machine, writing the received data into the available buffer address using DMA, and notifying the guest operating system that data in the available buffer is ready to be consumed.

One computer system, according to an embodiment of the invention, comprises a NIC that performs DMA and a processor programmed to execute a hypervisor software layer to instantiate virtual machines. Each virtual machine instantiated by the hypervisor software layer comprises a guest operating system. The computer system further comprises a memory component that stores, for each instantiated virtual machine, (a) a first descriptor ring for providing buffer addresses from a memory space of the guest operating system to the hypervisor software layer, wherein each entry of the first descriptor ring has an ownership value that is either the hypervisor software layer, the guest operating system or the NIC, and (b) a second descriptor ring for providing the buffer addresses from the hypervisor software layer to the NIC.

BRIEF DESCRIPTION OF THE DRAWINGS

FIG. 13 is a schematic diagram of a computer system with a multi-queue NIC supporting multiple instantiations of virtual machines.

FIGS. 14A to 14B are tables categorizing the different scenarios that arise when data is received by a virtual machine and the corresponding course of action taken by a hypervisor.

DETAILED DESCRIPTION

Figure 1:
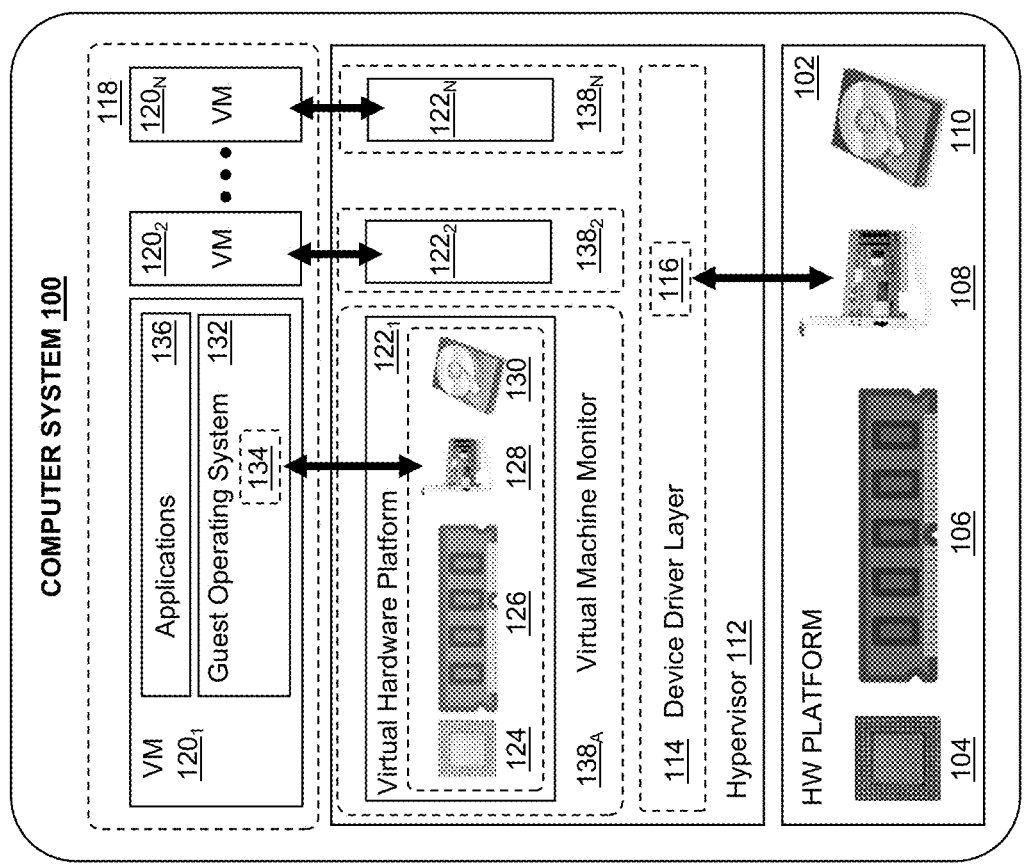
FIG. 1 is a block diagram of a computer system implementing a virtualized computer platform.

FIG. 1 depicts a block diagram of a virtualized computer system 100 in which one or more embodiments of the invention may be practiced. A computer system 100 may be constructed on a desktop, laptop or server grade hardware platform 102 such as the x86 architecture platform. Such a hardware platform may include a CPU 104, RAM 106, NIC 108, hard drive 110 and other I/O devices such as mouse and keyboard (not shown in FIG. 1). A virtualization software layer, also referred hereinafter as hypervisor 112 is installed on top of hardware platform 102 and supports a virtual machine execution space 118 within which multiple VMs $120_1$-$120_N$ may be concurrently instantiated and executed. Hypervisor 112 includes a device driver layer 114 that includes a NIC device driver 116 that communicates with NIC 108. Hypervisor 112 maps the physical resources of hardware platform 102 (e.g., CPU 104, RAM 106, network card 108, hard drive 110, mouse, keyboard, etc.) to the "virtual" resources of each virtual machines $120_1$ to $120_N$, such that each virtual machine $120_1$ to $120_N$ has its own virtual hardware platform $122_1$ to $122_N$ with its own emulated hardware such as CPU 124, RAM 126, NIC 128, hard drive 130 and other emulated I/O devices in VM $120_1$. For example, virtual hardware platform $122_1$ may function as the equivalent of a standard x86 hardware architecture such that any x86 supported operating system, e.g., Microsoft Windows, Linux, Solaris x86, NetWare, FreeBSD, etc., may be installed as the guest operating system 132 in order to execute applications 136 for an instantiated virtual machine, e.g., VM $120_1$. Such a guest operating system 132 would include a virtual NIC device driver 134 to interact with virtual NIC 128. Virtual hardware platforms $122_1$ to $122_N$ may be considered to be part of hypervisor's 112 virtual machine monitors (VMM) $138_A$-$138_N$, which implement the virtual system support needed to coordinate operation between the hypervisor 112 and the corresponding virtual machines $120_1$ to $120_N$. It should be recognized that the various terms, layers and categorizations used to describe the virtualization components in FIG. 1 may be referred to differently without departing from their functionality or the spirit or scope of the invention. For example, virtual hardware platforms $122_1$ to $122_N$ may also be considered to be separate from VMMs $138_A$ to $138_N$ and VMMs $138_A$ to $138_N$ may be considered to be separate from hypervisor 112. One example of a hypervisor 112 that may be used in an embodiment of the invention is VMkernel™ which is implemented in VMware's ESX® product.

Figure 2:
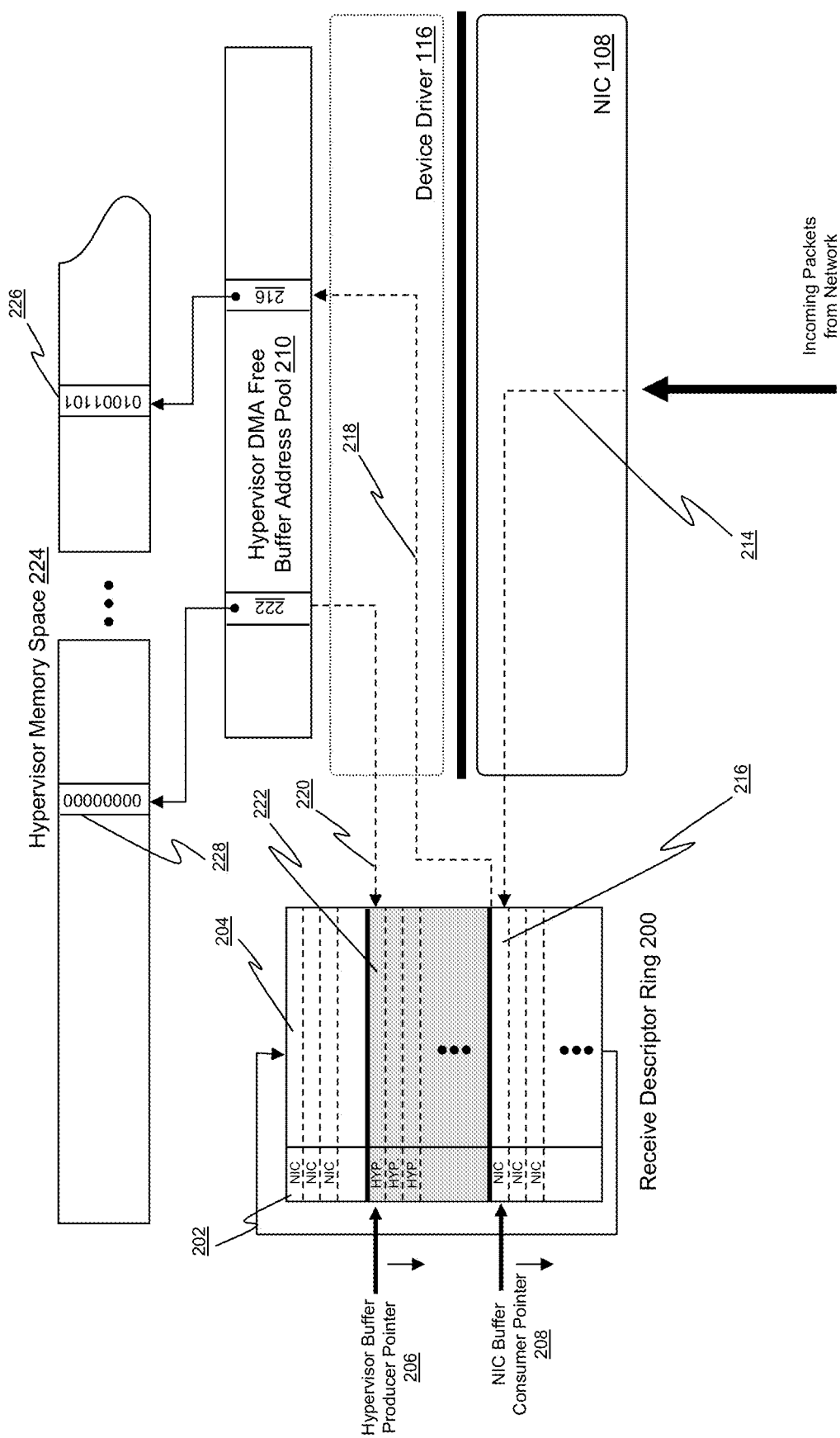
FIG. 2 is a schematic diagram depicting a descriptor ring utilized by a NIC and a hypervisor.

In order to coordinate the availability of buffers during DMA, a circular queue data structure known as a ring is shared between NIC 108 and NIC device driver 116. FIG. 2 depicts a schematic diagram of a descriptor ring 200 data structure that is accessed by both NIC 108 and device driver 116 of hypervisor 112 when data is received by NIC 108. Each entry (hereinafter, referred to as a "descriptor") of descriptor ring 200 contains a descriptor identification 202 (a "descriptor ID") and a buffer address 204. Each descriptor ID also contains an "ownership" indicator whose value is either NIC 108 or hypervisor 112. Associated with descriptor ring 200 are two descriptor pointers, a producer pointer 206 and a consumer pointer 208 which cycle through the descriptors as further detailed in FIG. 3. Producer pointer 206 is utilized by hypervisor 112 to add addresses of free buffers from a pool of available buffer addresses 210 allocated from the memory space 224 of hypervisor 112 to be used for DMA communication through NIC 108. Producer pointer 206 points to a first descriptor in descriptor ring 200 that is "owned" by hypervisor 112. As depicted in FIG. 2, descriptors owned by hypervisor 112 are darkened. A buffer address with a descriptor owned by hypervisor 112 will not be written to by NIC 108 (similarly, a buffer address with a descriptor owned by NIC 108 will not be written to by hypervisor 112). In contrast, consumer pointer 208 points to the first descriptor in descriptor ring 200 that is "owned" by NIC 108. As depicted in FIG. 2, descriptors owned by NIC 108 are shaded as white and the buffer addresses of these descriptors are used by NIC 108 to store incoming network data (as exemplified by arrow 214). It should be recognized that the concept of descriptor ownership and ownership values as used herein may be implemented in a variety of ways in addition to an indicator value in a descriptor ID as described in the foregoing. For example, ownership values may be determined by enabling shared access to pointers of descriptor ring 200 between a consumer (e.g., NIC 108) and a producer (e.g., hypervisor 112). The position of a descriptor relative to the positions of such pointers provides enough information to determine an ownership value. In one embodiment, ownership values are determined by enabling shared access to producer pointer 206 and consumer pointer 208 between hypervisor 112 and NIC 108. As depicted in FIG. 2, those descriptors whose indices are greater than producer pointer 206 but less than consumer 208 are owned by hypervisor 112 (e.g., darkened area in FIG. 2) while those descriptors whose indices are less than producer pointer 206 or greater than consumer pointer 208 are owned by NIC 108 (e.g., white area in FIG. 2).

After network data is written during DMA by NIC 108 into a buffer, such as buffer 226, pointed to by descriptor's buffer address, such as address 216, the data will be eventually consumed by hypervisor 112 and afterwards, as shown by arrow 218, address 216 will be placed back into free buffer address pool 210 (from where it was originally allocated for DMA by hypervisor 112 at a prior point in time). Similarly, as shown by arrow 220, free buffer addresses, such as address 222 are placed into descriptor ring 200 in order to continually provide NIC 108 with free buffers such as buffer 228 for DMA.

Figure 3:
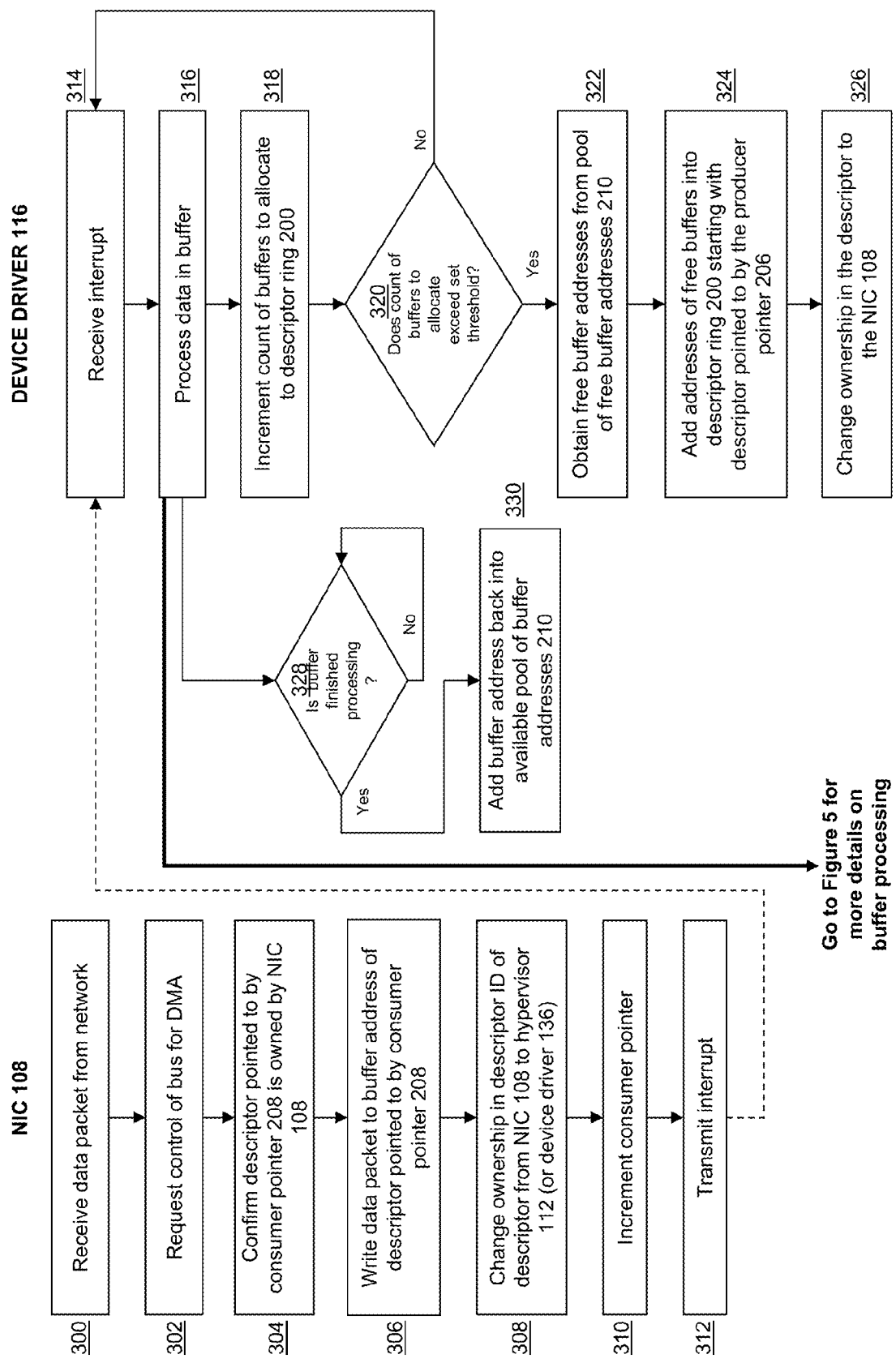
FIG. 3 is a flow chart of the interaction between a NIC and hypervisor through a descriptor ring.

FIG. 3 depicts a flow chart of the interaction among descriptor ring 200, NIC 108 and device driver 116 during DMA when zero-copy techniques are not being employed. In step 300, NIC 108 receives network data and in step 302, requests control of a system bus in computer system 100 to perform DMA. Once NIC 108 has control of the system bus, in step 304, it verifies that the descriptor pointed to by consumer pointer 208 is owned by NIC 108. Upon verification, in step 306, NIC 108 writes an incoming network data packet into the buffer address associated with the descriptor. In step 308, NIC 108 changes ownership of the descriptor ID of the descriptor from NIC 108 to hypervisor 112 (or device driver 116) so that device driver 116 will be authorized to process the buffer upon completion of DMA by NIC 108. In step 310, NIC 108 increments consumer pointer 208 to point to the next descriptor in descriptor ring 200. In step 312, NIC 108 transmits an interrupt to computer system 100 to notify device driver 116 to process the network data written into the buffer address of the descriptor.

Upon receiving the interrupt in step 314, device driver 116 processes the written buffer in step 316, by passing it to hypervisor 112 to determine which virtual machine the data belongs to. In step 318, device driver 116 increments a count relating to the number of buffers that need to be allocated back to descriptor ring 200 (i.e., because NIC 108 has used a buffer given to it by descriptor ring 200 in step 306). In step 320, if this count exceeds a threshold value, device driver 116 enters a batch processing task to refill descriptor ring 200 with more free buffer addresses from buffer address pool 210. In step 322, device driver 116 obtains the addresses of free buffers (e.g., the number of buffers obtained may be the same as the aforementioned count) from buffer address pool 210 and in step 324, it adds these addresses into the descriptors, beginning with the descriptor pointed to by producer pointer 206 and subsequently incrementing producer pointer 206 to the next descriptor (and also verifies that hypervisor 112 owns these descriptors by checking their descriptor IDs). In step 326, for each such descriptor that is allocated a new free buffer address, device driver 116 changes the ownership of the descriptor from hypervisor 112 to NIC 108 in order to provide NIC 108 with free buffer addresses for DMA when it access descriptor ring 200. In the meantime, in step 328, if processing of the written buffer is completed, its address is added back into buffer address pool 210 in step 330 so that the address can be allocated back into descriptor ring 200 for use by NIC 108 for DMA in the future (during a step similar to step 306).

Figure 4:
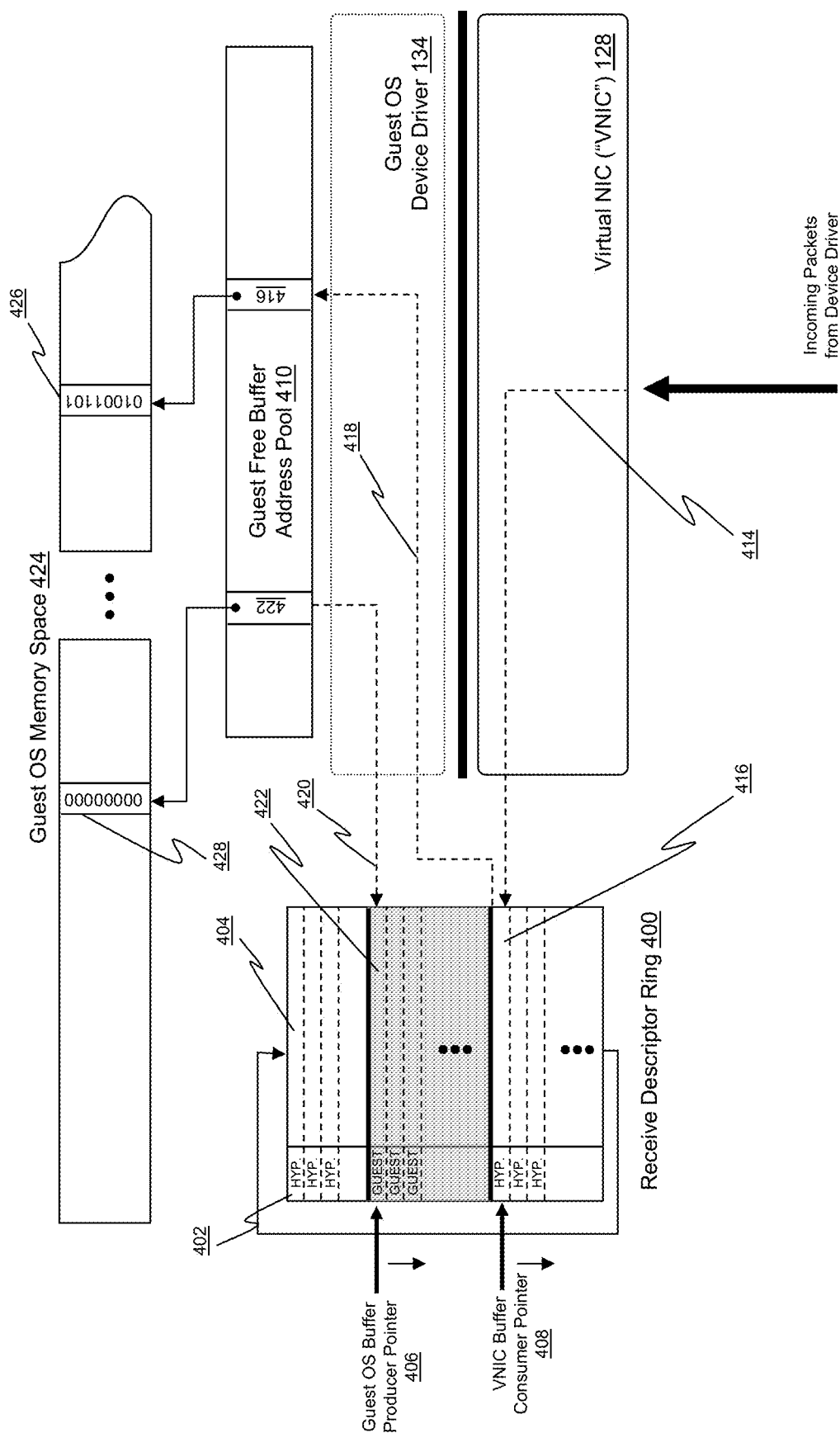
FIG. 4 is a schematic diagram depicting a descriptor ring utilized by a hypervisor and a guest device driver.

Similar to FIG. 2, but implemented at a higher virtual level, FIG. 4 depicts a schematic diagram of a descriptor ring 400 data structure that is used to receive data packets originating from device driver 116 and that is accessed by both virtual NIC 128 (hereinafter also referred to as "VNIC") and guest device driver 134 of guest operating system 132. Each descriptor of descriptor ring 400 also contains a descriptor ID 402 and a buffer address 404. Each descriptor ID contains an "ownership" indicator whose value is either hypervisor 112 or guest operating system 132. Associated with descriptor ring 400 are two descriptor pointers, a producer pointer 406 and a consumer pointer 408 which cycle through the descriptors as further detailed in FIG. 5. Producer pointer 406 is utilized by guest device driver 134 to add addresses of free buffers from a pool 410 of available buffer addresses allocated from a memory space 424 of guest operating system 132 to be used by VNIC 128 to write data received by hypervisor 112 directly into memory space 424 of guest operating system 132. Producer pointer 406 points to a first descriptor in descriptor ring 400 that is owned by guest operating system 132. As depicted in FIG. 4, descriptors owned by guest operating system 132 are darkened. A buffer address with a descriptor owned by guest operating system will not be written to by VNIC 128 (similarly, a buffer address with a descriptor owned by VNIC 128 will not be written to by guest operating system 132). In contrast, consumer pointer 408 points to the first descriptor in descriptor ring 400 that is owned by hypervisor 112. As depicted in FIG. 4, descriptors owned by hypervisor 112 are shaded as white and the buffer addresses of these descriptors are used by VNIC 128 (a component of hypervisor 112) to store incoming data from device driver 116 (as exemplified by arrow 414). After data is written by VNIC 128 into a buffer such as 426 pointed to by a descriptor's buffer address, such as address 416, the data will be eventually consumed by guest operating system 132 and afterwards, as shown by arrow 418, address 416 will be placed back into free buffer address pool 410 (from where it was originally allocated by guest operating system 132 at a prior point in time). Similarly, as shown by arrow 420, free buffer addresses, such as address 422 are placed into descriptor ring 400 in order to continually provide VNIC 128 with free buffers, such as 428, to write data incoming from device driver 116.

Figure 5:
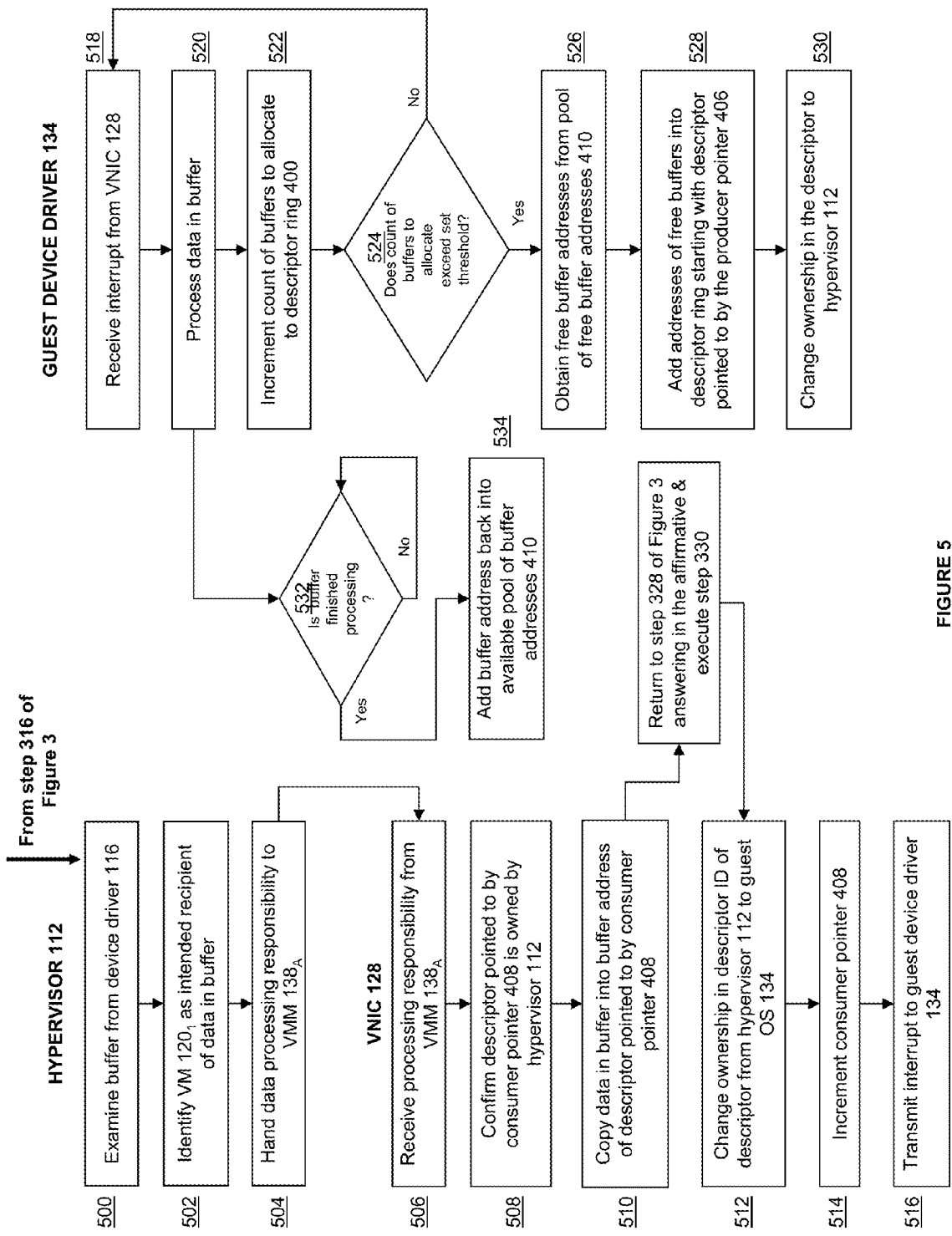
FIG. 5 is a flow chart of the interaction between a virtual NIC and a guest device driver through a descriptor ring.

FIG. 5 provides a flow of further detail relating to the processing of the buffer in step 316. In step 500, hypervisor 112 examines the data in the buffer and, in step 502, identifies virtual machine 120₁ as the virtual machine instance that is the intended recipient of the data. In step 504, hypervisor 112 hands the data processing responsibility off to VMM 138₄. In step 506, VNIC 128, as the virtual network hardware component of VMM 138₄, receives data processing responsibility from VMM 138₄. In step 508, VNIC 128 verifies that the descriptor pointed to by consumer pointer 408 is owned by hypervisor 112. Upon verification, VNIC 128 copies the data from the buffer (which belongs to hypervisor's 112 own memory space 224 as described in FIG. 3) into the buffer address associated with the descriptor in step 510. This buffer address originates from the memory space 424 of guest operating system 132. Once the data is copied from the first buffer belonging to hypervisor's 112 memory space 224 into the buffer address belonging to the memory space 424 of guest operating system 132, processing of the first buffer is complete and the flow returns to step 328, answering in the affirmative, and subsequently executed step 330. In step 512, VNIC 128 changes ownership of the descriptor ID of the descriptor from hypervisor 112 to guest operating system 132 (or guest device driver 134) so that guest device driver 134 will be authorized to process the buffer when VNIC 128 completes copying the data into the buffer in step 510. In step 514, VNIC 128 increments consumer pointer 408 to point to the next descriptor in descriptor ring 400. In step 516, VNIC 128 transmits an interrupt to guest operating system 132 to notify guest device driver 134 to process the data written into the buffer address of the descriptor.

Upon receiving the interrupt in step 518, guest device driver 134 processes the written buffer in step 520, by passing it up through the networking stack of the guest operating system 132. In step 522, guest device driver 134 increments a count relating to the number of buffers that need to be allocated back to descriptor ring 400 (i.e., because VNIC 128 has used a buffer given to it by descriptor ring 400 in step 510). In step 524, if this count exceeds a threshold value, guest device driver 134 enters a batch processing task to refill descriptor ring 400 with more free buffer addresses from buffer address pool 410. In step 526, guest device driver 134 obtains the addresses of free buffers (e.g., the number of buffers obtained may be the same as the aforementioned count) from buffer address pool 410 and in step 528, it adds these addresses into the descriptors, beginning with the descriptor pointed to by producer pointer 406 and subsequently incrementing producer pointer 406 to the next descriptor (and also verifies that guest operating system 132 owns these descriptors by checking their descriptor IDs). In step 530, for each such descriptor that is allocated a new free buffer address, guest device driver 134 changes the ownership of the descriptor from guest operating system 132 to hypervisor 112 in order to provide VNIC 128 (a component of hypervisor 112) with free buffers to copy data when it receives processing responsibility of data received from device driver 116 (similar to step 506). In the meantime, in step 532, if processing of the copied buffer is completed, its address is added back into buffer address pool 410 in step 534 so that the address can be allocated back into descriptor ring 400 for use by VNIC 128 in the future (during a step similar to step 510).

Figure 6:
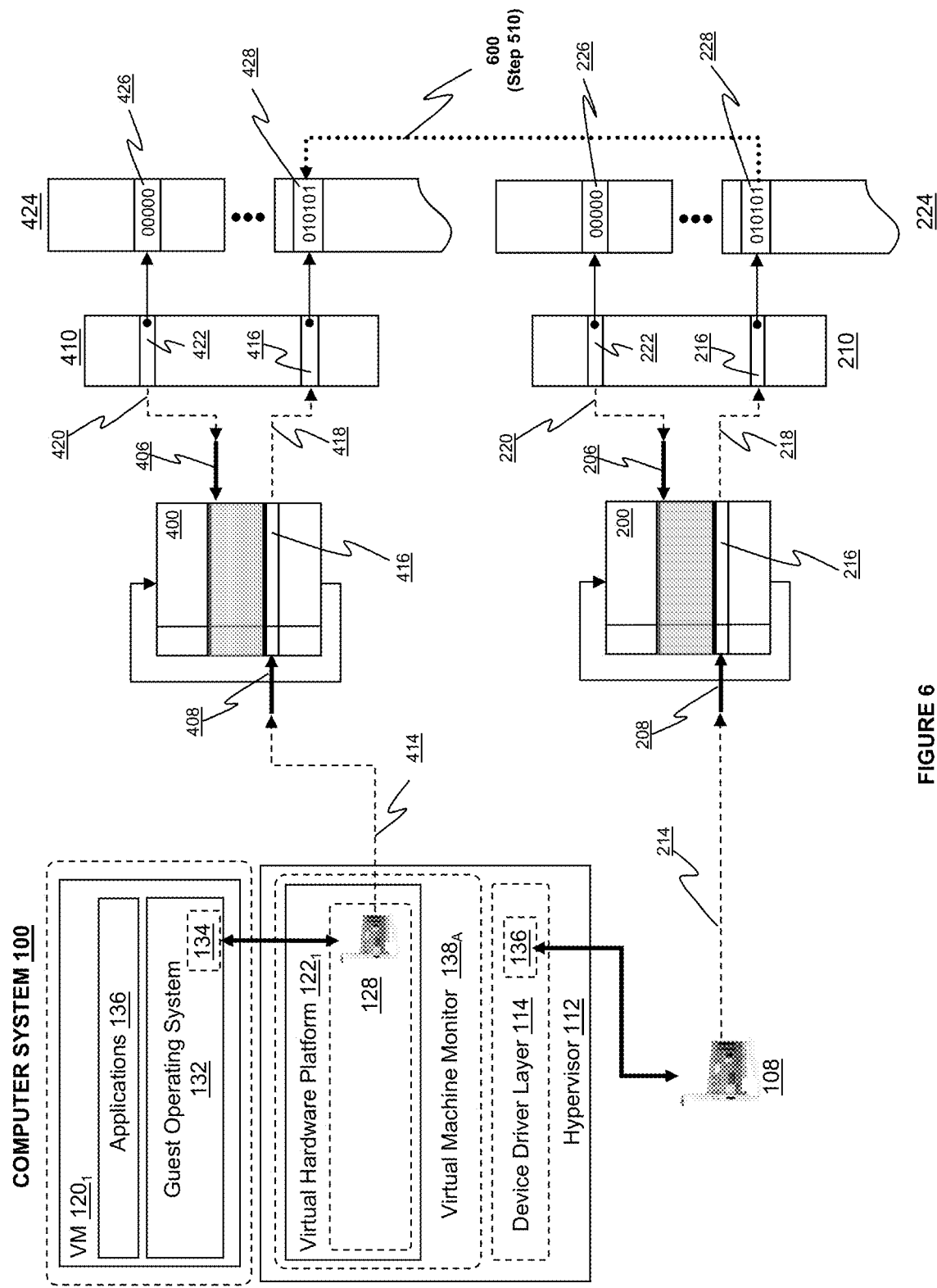
FIG. 6 is a schematic diagram of the interactions of physical and virtual components in a computer system to receive incoming network data.

FIG. 6 combines FIGS. 1, 2 and 4 to provide a consolidated view of the interactions among components to direct network data received from NIC 108 to virtual machine 120₁. As previously discussed, when a data packet is received by NIC 108, it writes the data into buffer 228 in memory space 224 of hypervisor 112 through DMA. Specifically, NIC 108 obtains address 216 of buffer 228 by accessing the descriptor in descriptor ring 200 pointed to by consumer pointer 208. NIC 108 then hands ownership of buffer 228 off to hypervisor 112 by changing the ownership information in the descriptor and generates an interrupt to inform hypervisor 112 to process the written data in buffer 228. In turn, hypervisor 112 receives the interrupt and determines that the data written in buffer 228 is associated with virtual machine 120₁ Hypervisor 112 then utilizes VNIC 128 in VMM 138₄ of virtual machine 120₁ to obtain buffer address 416 of guest operating system memory space 424 by accessing the descriptor in descriptor ring 400 pointed to by consumer pointer 408. Hypervisor 112 (via VNIC 128) then copies the contents of buffer 228 into buffer 428 (step 510 of FIG. 5 depicted as 600) pointed to by address 416 and hands ownership of buffer 428 to guest operating system 132 (via guest device driver 134) for data processing.

Figure 7:
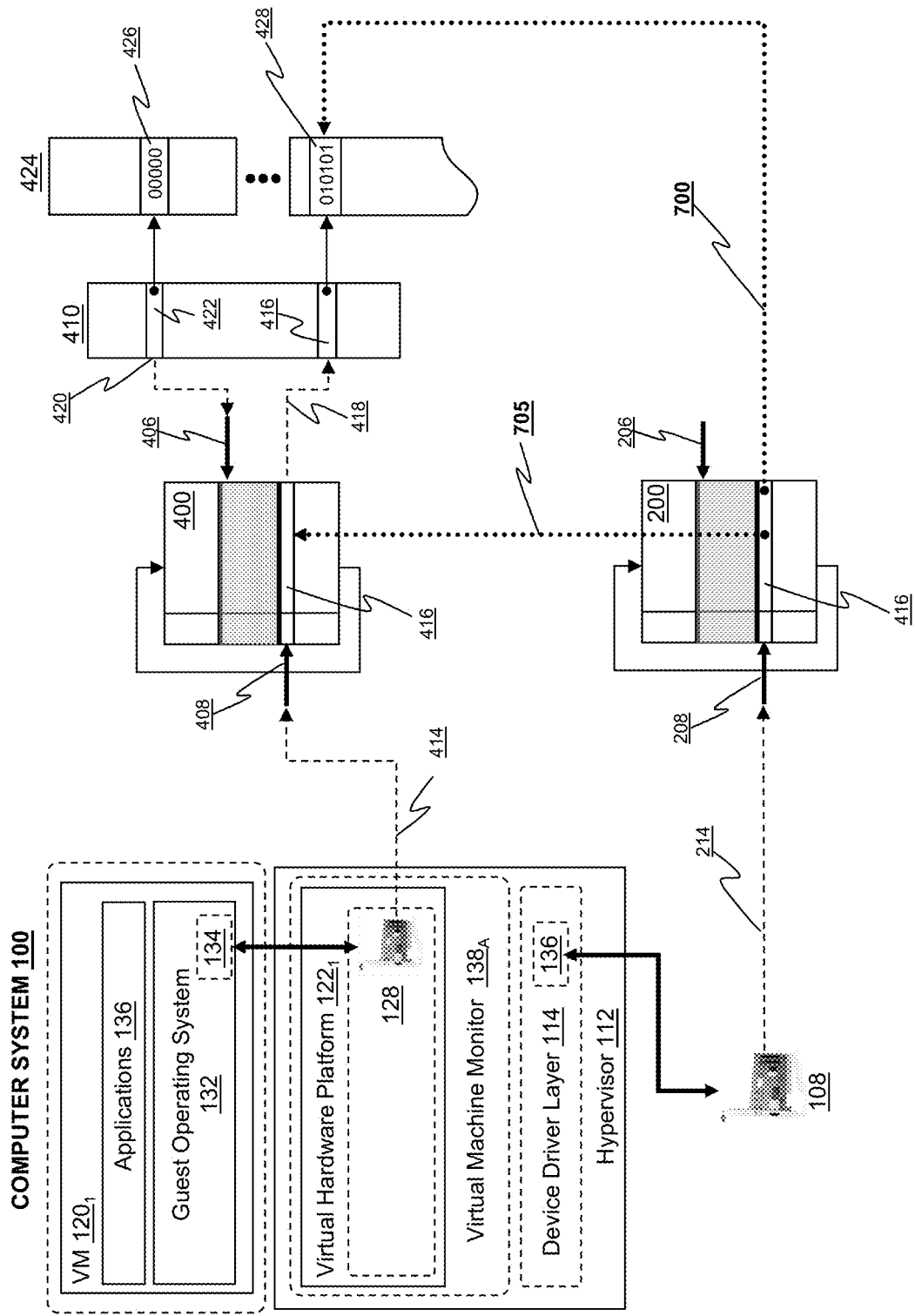
FIG. 7 is a schematic diagram of the interactions of physical and virtual components in a computer system to receive incoming network data utilizing "zero-copy" techniques.

FIG. 7 provides a consolidated view of interactions among the various components discussed in the context of FIGS. 1 through 5 where such interactions circumvent the step of copying data (i.e., step 510 of FIG. 5) from buffer 228 of hypervisor memory 224 to buffer 428 of guest operating system memory 424, i.e., when zero-copy techniques are being employed in accordance with one or more embodiments of the invention. Here, descriptor ring 200 is dedicated to servicing VM 120$_1$ and thus contains free buffer addresses from guest operating system memory space 424 rather than from hypervisor memory space 224. When NIC 108 receives network data and obtains an address of a buffer from the descriptor pointed to by consumer pointer 208, the address, such as 416, resides in guest operating system memory space 424. As such, incoming network data is written by NIC 108 directly into buffer 428 in memory space 424 of guest operating system 132, as indicated by arrow 700. When ownership of buffer 428, as set in the descriptor in descriptor ring 200, is handed off from NIC 108 to hypervisor 112 (as in step 308), hypervisor 112, via VNIC 128, copies address 416 of buffer 428 into the address entry of the descriptor in descriptor ring 400 pointed to by consumer pointer 408 as indicated by arrow 705. Hypervisor 112 then changes ownership of buffer 428, as set in the descriptor of descriptor ring 400, to guest operating system 132 (as in step 512) which is then able to process the network data written into buffer 428.

In the method illustrated in FIG. 7, descriptor IDs for descriptors in descriptor ring 400 support three different ownership values: guest 132, hypervisor 112 and NIC 108. These three ownership values enable hypervisor 112 to manage state information when transitioning incoming network data from hardware platform 102 to virtual hardware platform 122$_1$.

Figure 8:
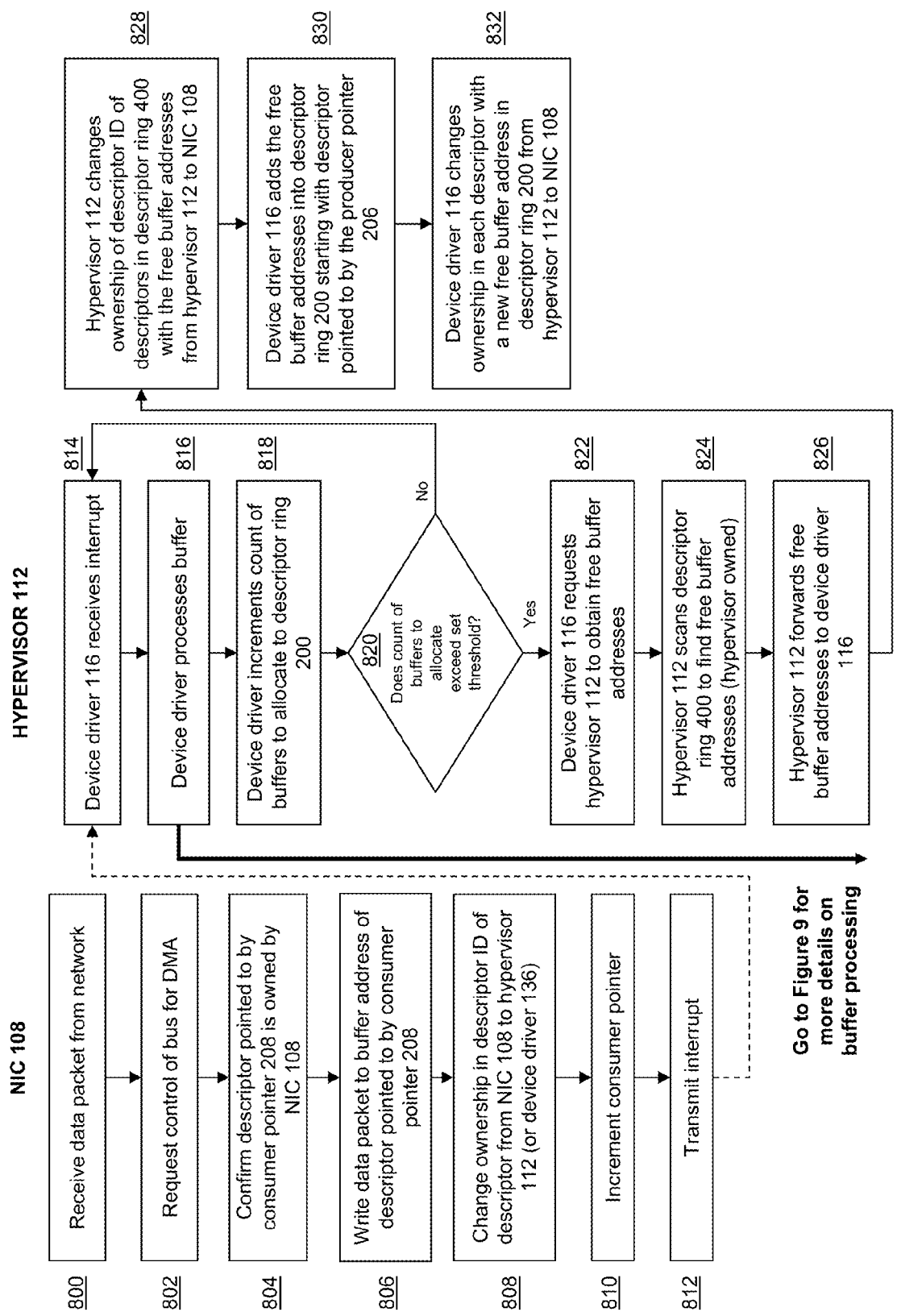
FIG. 8 is a flow chart of the interaction between a NIC and hypervisor through a descriptor ring to achieve zero copy.

FIG. 8 depicts a flow chart of the interaction among descriptor ring 200, NIC 108 and hypervisor 112 during DMA when the method of FIG. 7 is carried out. In step 800, NIC 108 receives network data and in step 802, requests control of a system bus in computer system 100 to perform DMA. Once NIC 108 has control of the system bus, in step 804, it verifies that the descriptor pointed to by consumer pointer 208 is owned by NIC 108. Upon verification, NIC 108 writes an incoming network data packet into the buffer address associated with the descriptor in step 806. Such buffer address resides in guest operating system memory space 424. In step 808, NIC 108 changes ownership of the descriptor ID of the descriptor from NIC 108 to hypervisor 112 so that hypervisor's 112 device driver 116 will be authorized to process the buffer upon completion of DMA by NIC 108. In step 810, NIC 108 increments consumer pointer 208 to point to the next descriptor in descriptor ring 200. In step 812, NIC 108 transmits an interrupt to computer system 100 to notify device driver 116 to process the network data written into the buffer address of the descriptor. It should be recognized that multiple buffers associated with multiple descriptors in descriptor ring 200 may be written to depending upon the amount of incoming network data.

Upon receiving the interrupt in step 814, device driver 116 processes the written buffer in step 816, by passing its address to hypervisor 112 in order for hypervisor 112 to forward it to VNIC 128. In step 818, device driver 116 increments a count relating to the number of buffers that need to be allocated back to descriptor ring 200 (i.e., because NIC 108 has used a buffer given to it by descriptor ring 200 in step 806). In step 820, if this count exceeds a threshold value, device driver 116 enters in a batch processing task to refill descriptor ring 200 with more free buffer addresses.

In step 822, device driver 116 requests hypervisor 112 to obtain free buffer addresses. In step 824, hypervisor 112 scans descriptor ring 400 to identify free buffer addresses in guest memory space 424. The buffer addresses in descriptors of descriptor ring 400 that indicate ownership by hypervisor 112 represent such free available buffers. Various methods may be employed to scan descriptor ring 400. For example, hypervisor 112 may maintain a pointer to the first descriptor entry of descriptor ring 400 whose descriptor ID indicates ownership by hypervisor 112. In step 826, hypervisor 112 forwards free buffer addresses identified in step 824 to device driver 116. In step 828, for each descriptor entry in descriptor ring 400 corresponding to a free buffer address forwarded in step 826, hypervisor 112 changes the ownership value of each descriptor from hypervisor 112 to NIC 108 to indicate that the buffer has been given to NIC 108. Such buffers are considered "in use" by the NIC 108 from the perspective of hypervisor 112 (while buffers owned by hypervisor 112 as indicated in descriptor ring 400 are considered "not in use" from the perspective of hypervisor 112). In step 830, device driver 116 adds the free buffer addresses into the descriptors of descriptor ring 200, beginning with the descriptor pointed to by producer pointer 206 and subsequently incrementing producer pointer 206 to the next descriptor (and also verifies that hypervisor 112 owns these descriptors by checking their descriptor IDs). In step 832, for each such descriptor that is allocated a new free buffer address, device driver 116 changes the ownership of the descriptor from hypervisor 112 to NIC 108 in order to provide NIC 108 with free buffer addresses for DMA when it accesses descriptor ring 200. It should be recognized that hypervisor 112, via device driver 116, may process multiple buffers during an interrupt session in a similar fashion.

Figure 9:
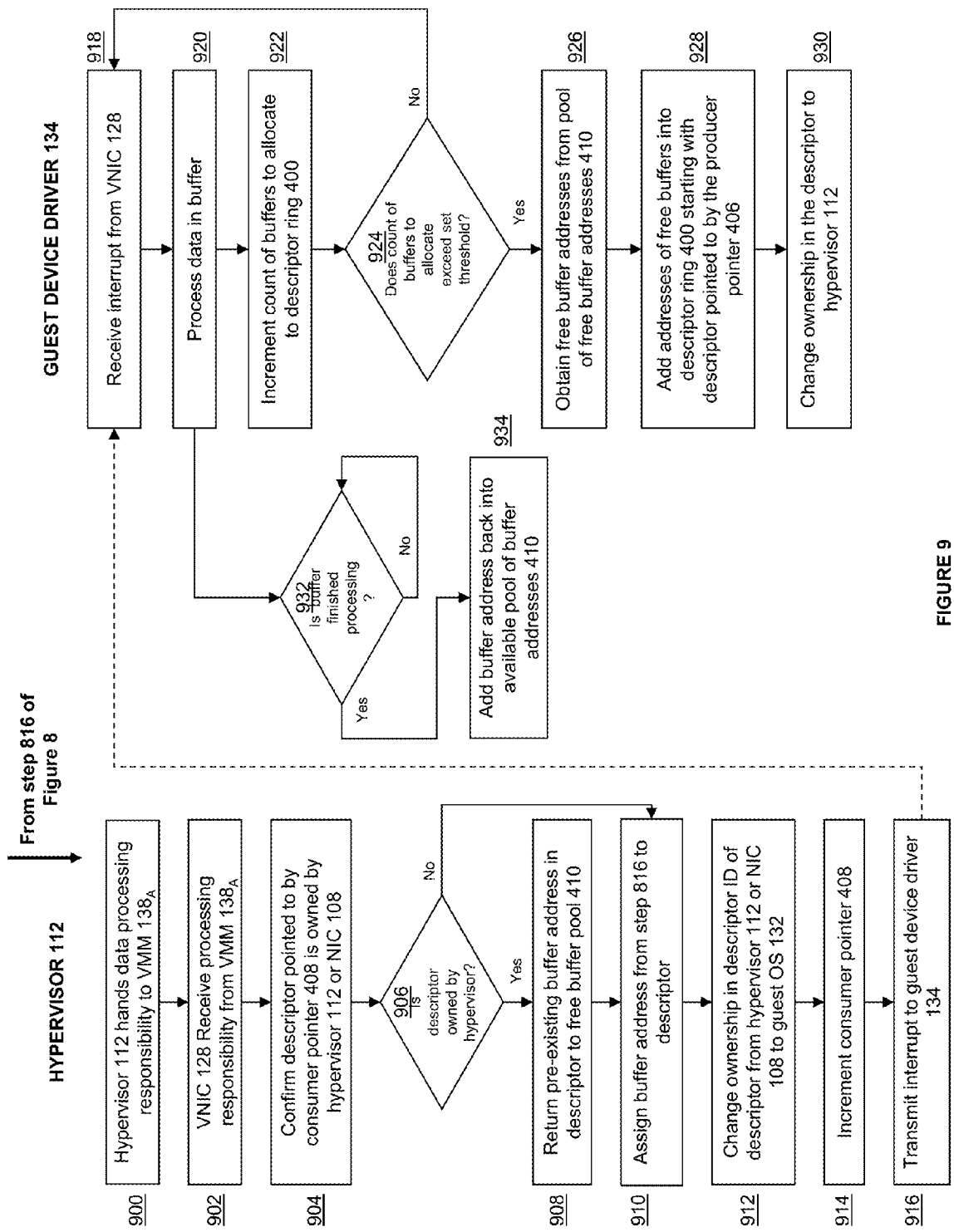
FIG. 9 is a flow chart of the interaction between a virtual NIC and a guest device driver through a descriptor ring to achieve zero copy.

FIG. 9 provides a flow of further detail relating to the processing of the buffer in step 816. In step 900, hypervisor 112 hands the data processing responsibility off to VMM 138$_A$. In step 902, VNIC 128 as the virtual network hardware component of VMM 138$_A$, receives data processing responsibility from VMM 138$_A$. In step 904, VNIC 128 verifies that the descriptor pointed to by consumer pointer 408 is either owned by hypervisor 112 or NIC 108. If, in step 906, the descriptor is owned by hypervisor 112, then in step 908, the pre-existing buffer address in the descriptor is returned to free guest buffer address pool 410 (this step may require communication by hypervisor 112 with guest operating system 132 in order to access guest buffer address pool 410). Other methods to keep track of such pre-existing buffer addresses may exist without communication between hypervisor 112 and guest operating system 132. For example, in one embodiment, hypervisor 112 may maintain a separate table to store the pre-existing buffer addresses in step 908. Hypervisor 112 may access such a table to obtain free buffer addresses, for example, in step 824 before scanning descriptor ring 400. In step 910, VNIC 128 assigns the buffer address from step 816 to the descriptor of step 906. In step 912, VNIC 128 changes ownership of the descriptor ID of the descriptor from either hypervisor 112 or NIC 108 to guest operating system 132 (or guest device driver 134) so that guest device driver 134 will be authorized to process the buffer. In step 914, VNIC 128 increments consumer pointer 408 to point to the next descriptor in descriptor ring 400. In step 916, VNIC 128 transmits an interrupt to guest operating system 132 to notify guest device driver 134 to process the data in the buffer address of the descriptor. It should be recognized that multiple buffer addresses may be handed off from device driver 116 in step

816 and written into the descriptors of descriptor ring 400 in step 910 depending upon the amount of incoming network data from NIC 108.

Upon receiving the interrupt in step 918, guest device driver 134 processes the buffer in step 920, by passing it up through the networking stack of the guest operating system 132. In step 922, guest device driver 134 increments a count relating to the number of buffers that need to be allocated back to descriptor ring 400 (i.e., because VNIC 128 has utilized a buffer space given to it by descriptor ring 400 in step 910). In step 924, if this count exceeds a threshold value, guest device driver 134 enters in a batch processing task to refill descriptor ring 400 with more free buffers from buffer address pool 410. In step 926, guest device driver 134 obtains the addresses of free buffers (e.g., the number of buffers obtained may be the same as the aforementioned count) from buffer address pool 410 and in step 928, it adds these addresses into the descriptors, beginning with the descriptor pointed to by producer pointer 406 and subsequently incrementing producer pointer 406 to the next descriptor (and also verifies that guest operating system 132 owns these descriptors by checking their descriptor IDs). In step 930, for each such descriptor that is allocated a new free buffer address, guest device driver 134 changes the ownership of the descriptor from guest operating system 132 to hypervisor 112 in order to provide hypervisor 112 with free buffer addresses to propagate to NIC 108 to write incoming data into memory space 424 of guest operating system 132 as detailed in steps 822 to 832. In the meanwhile, in step 932, if processing of the buffer is completed, its address is added back into the buffer address pool 410 in step 934 so that the address can be allocated back into descriptor ring 400 for use by hypervisor 112 in the future (during steps 926 to 930). It should be recognized that guest device driver 134 may process multiple buffers during an interrupt session in a similar fashion.

Figure 10:
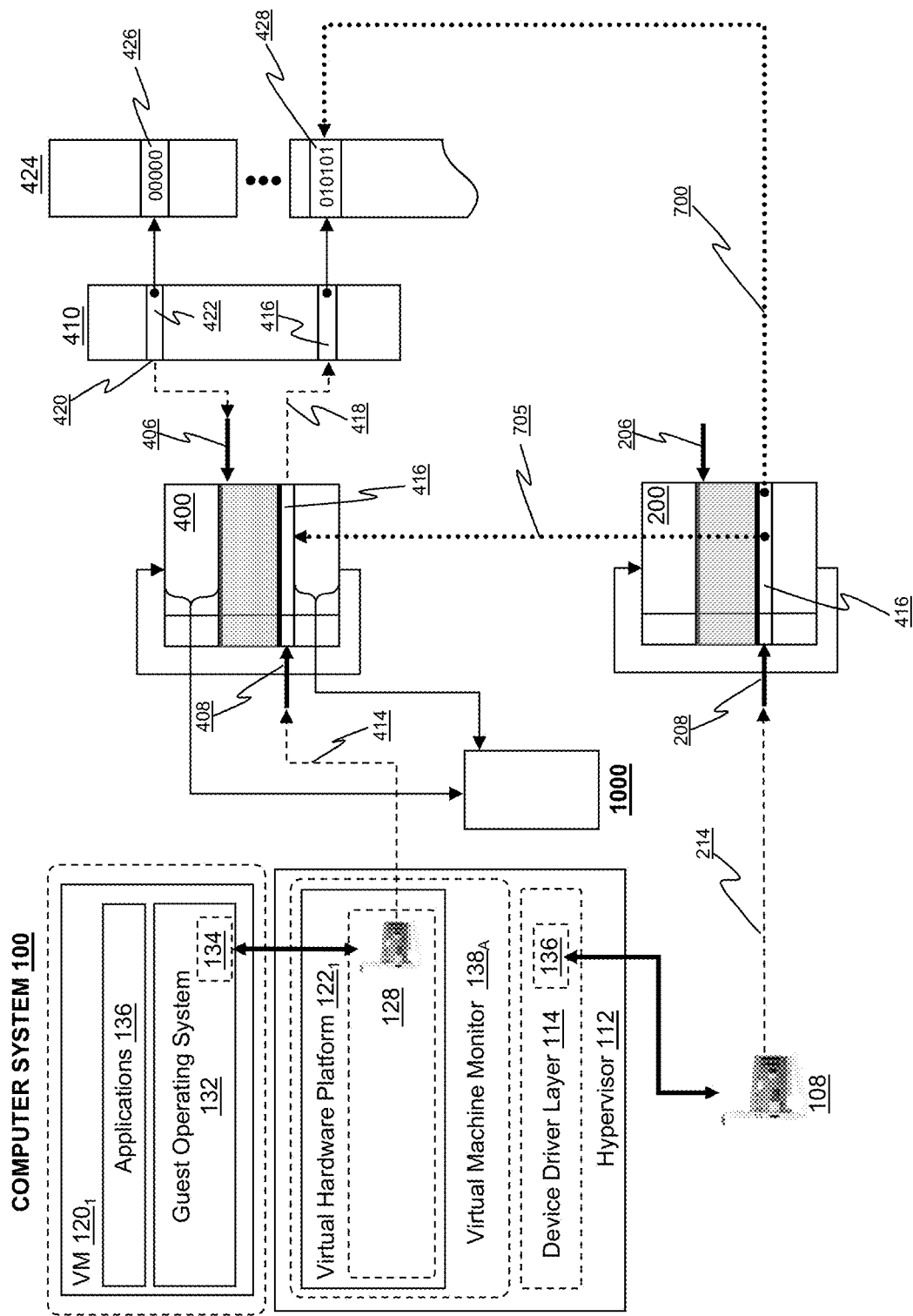
FIG. 10 is a schematic diagram of the interactions of physical and virtual components, including an intermediate table, in a computer system to receive incoming network data utilizing zero-copy techniques.

FIG. 10 depicts an alternative embodiment of the invention where hypervisor 112 maintains an intermediate table 1000 of freely available buffer addresses originating from guest operating system memory space 424. For example, due to interrupt contexts or lock issues, in certain situations, hypervisor 112 may not have permission to access descriptor ring 400 in step 824 during a batch process to provide free buffer addresses from guest operating system memory space 424 to NIC 108 (e.g., guest device driver 134 may be currently accessing descriptor ring 400, etc.). Intermediate table 1000 provides hypervisor the ability to access such free buffer addresses even when it cannot access and scan descriptor ring 400 as in step 824.

Figure 11:
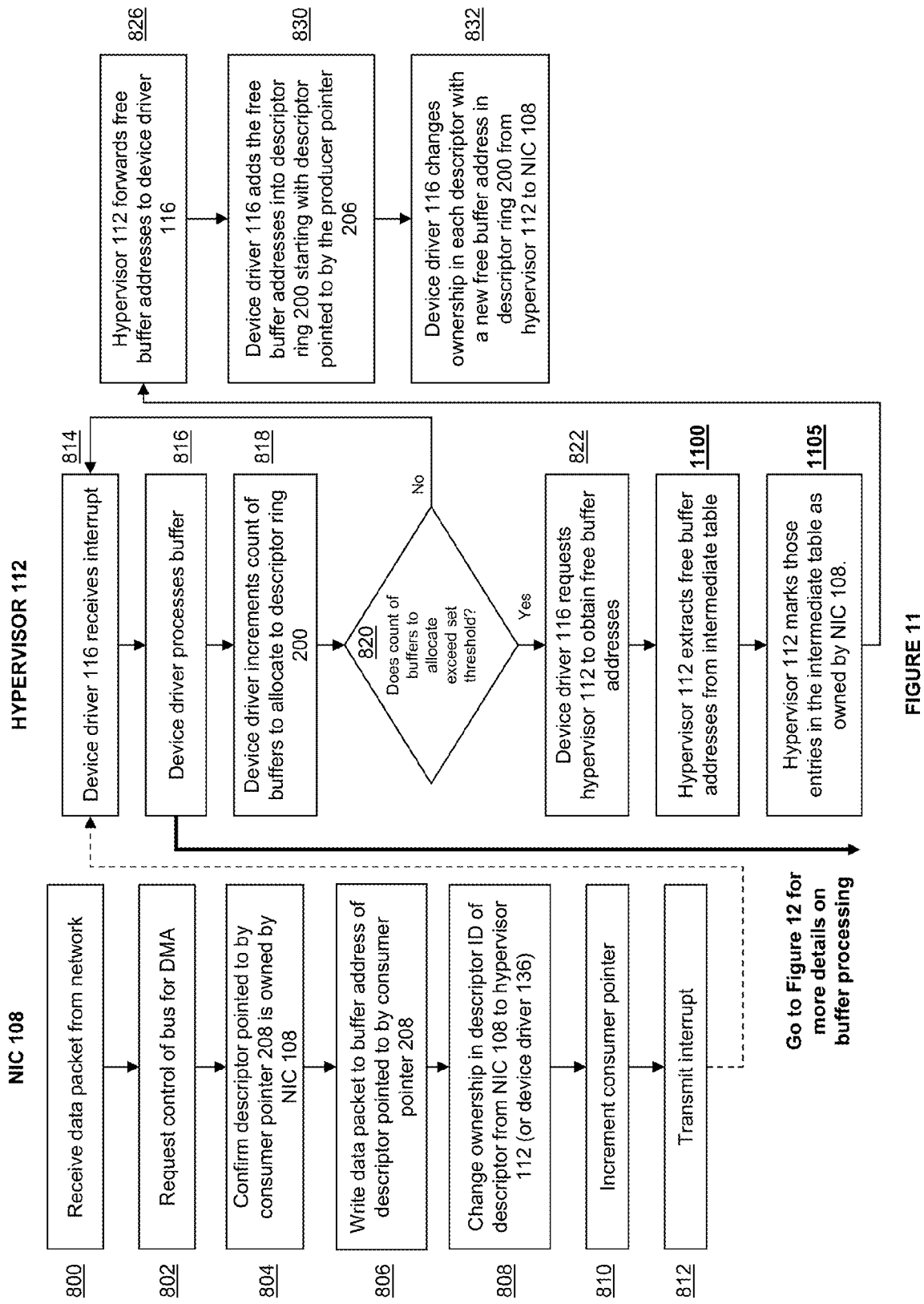
FIG. 11 is a flow chart of the interaction between a NIC and hypervisor through a descriptor ring to achieve zero copy through the use of an intermediate table.

FIG. 11 depicts a flow chart of the interaction among descriptor ring 200, NIC 108 and hypervisor 112 during DMA in the embodiment of FIG. 10. The steps of NIC 108 in FIG. 11 are the same as the steps of NIC 108 in FIG. 8. However, after step 822 at hypervisor 112, when device driver 116 requests hypervisor 112 to obtain free buffer addresses, in step 1100, hypervisor 112 extracts free buffer addresses from intermediate table 1000 as opposed to accessing descriptor ring 400 in step 824 of FIG. 8. In step 1105, hypervisor 112 changes ownership of the extracted free buffer address from hypervisor 112 to NIC 108 in the ownership indicator of the corresponding entries in the intermediate table. In step 826, hypervisor 112 forwards free buffer addresses extracted in step 1100 to device driver 116. In step 830, device driver 116 adds the free buffer addresses into the descriptors of descriptor ring 200, beginning with the descriptor pointed to by producer pointer 206 and subsequently incrementing producer pointer 206 to the next descriptor (and also verifies that hypervisor 112 owns these descriptors by checking their descriptor IDs). In step 832, for each such descriptor that is allocated a new free buffer address, device driver 116 changes the ownership of the descriptor from hypervisor 112 to NIC 108 in order to provide NIC 108 with free buffer addresses for DMA when it accesses descriptor ring 200. It should be recognized that hypervisor 112, via device driver 116, may process multiple buffers during an interrupt session in a similar fashion.

Figure 12:
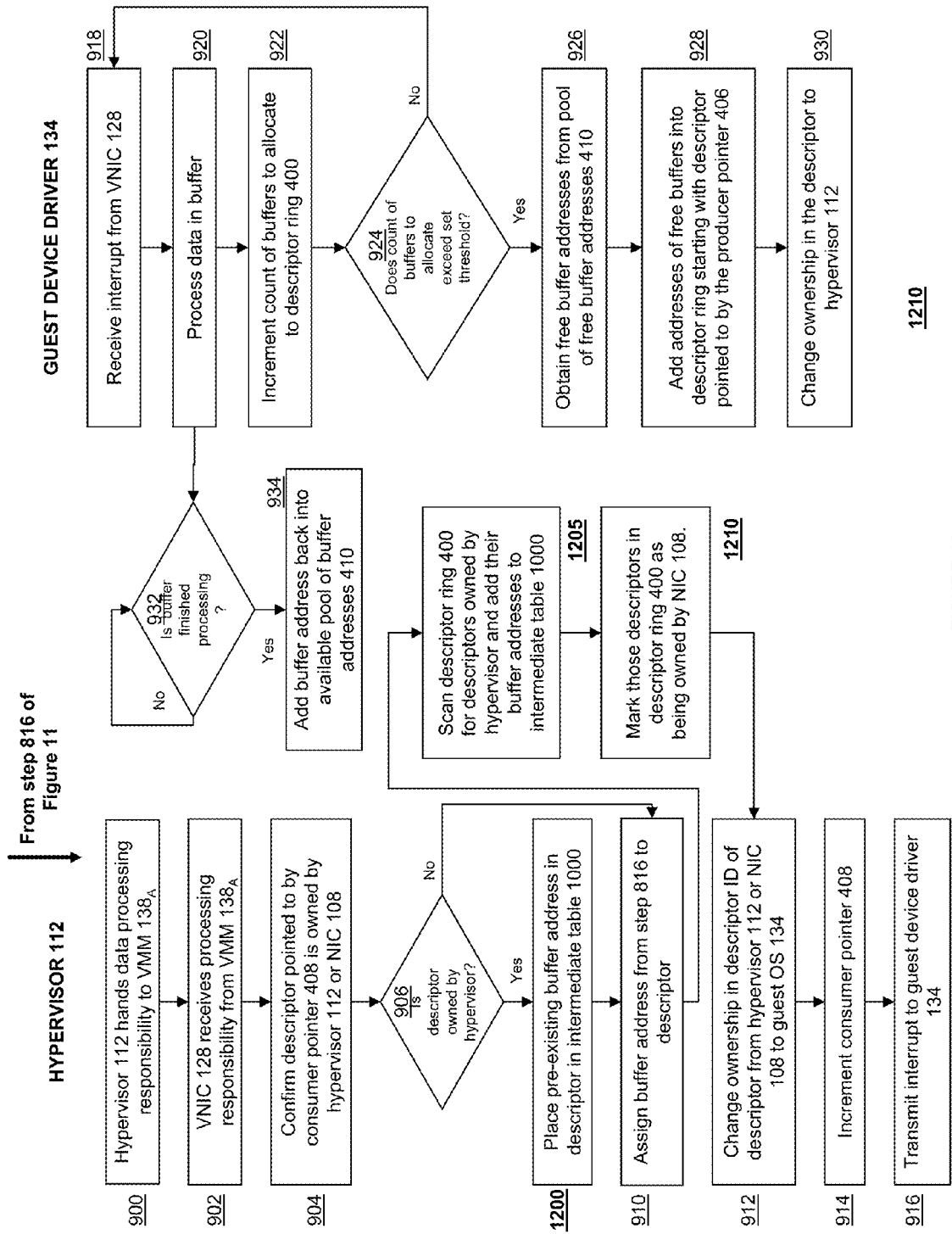
FIG. 12 is a flow chart of the interaction between a virtual NIC and a guest device driver through a descriptor ring to achieve zero copy through the use of an intermediate table.

FIG. 12 provides a flow of further detail relating to the processing of the buffer in step 816 in FIG. 11. In step 900, hypervisor 112 hands the data processing responsibility off to VMM 138$_A$. In step 902, VNIC 128 as the virtual network hardware component of VMM 138$_A$, receives data processing responsibility from VMM 138$_A$. In step 904, VNIC 128 verifies that the descriptor pointed to by consumer pointer 408 is either owned by hypervisor 112 or NIC 108. If, in step 906, the descriptor is owned by hypervisor 112, then in step 1200, an entry for the pre-existing buffer address in the descriptor is added to intermediate table 1000. In step 910, VNIC 128 assigns the buffer address from step 816 to the descriptor. In step 1205, VNIC 128 scans descriptor ring 400 for descriptors owned by hypervisor and adds their buffer addresses to intermediate table 1000 (for future use in steps 1100 to 1105 of FIG. 11). In step 1210, hypervisor 112 marks those descriptors in descriptor ring 400 as being owned by NIC 108. In step 912, VNIC 128 changes ownership of the descriptor ID of the descriptor from either hypervisor 112 or NIC 108 to guest operating system 132 (or guest device driver 134) so that guest device driver 134 will be authorized to process the buffer. In step 914, VNIC 128 increments consumer pointer 408 to point to the next descriptor in descriptor ring 400. In step 916, VNIC 128 transmits an interrupt to guest operating system 132 to notify guest device driver 134 to process the data in the buffer address of the descriptor. It should be recognized that multiple buffer addresses may be handed off from device driver 116 in step 816 and written into the descriptors of descriptor ring 400 in step 910 depending upon the amount of incoming network data from NIC 108. Upon receiving the interrupt in step 918, the same steps 920 though 934 are taken by guest device driver 134 in the embodiment of FIG. 12 as in FIG. 9.

While the schematics of FIGS. 7 and 10 (and the corresponding flows of FIGS. 8, 9, 11 and 12) describe a method in which descriptor ring 200 of NIC 108 is devoted to servicing VM 120$_1$, other instantiations of virtual machines on computer system 100 may also be supported. In one alternative embodiment, such other virtual machines are serviced by hypervisor 112 in a manner similar to the flows of FIGS. 3 and 5 by treating the buffer addresses in descriptor ring 200 (which are addresses originating from guest operating system 132 of VM 120$_1$) like buffer addresses in hypervisor memory space 224 and performing copies of the content of the buffers into buffer addresses in their own respective memory spaces (as in step 510 of FIG. 5).

It should be recognized that a variety of NICs may be utilized in embodiments of the invention. For example, NIC 108 may be a multi-queue or multi-function NIC that is able to respectively allocate multiple physical queues or physical functions (e.g., ports) on the NIC to different instantiated virtual machines. Alternatively, NIC 108 may support the single-root I/O virtualization (SR-IOV) specification for partitioning the bandwidth of a single port (or function) on the NIC into queues that can be dedicated to specific virtual machines. In an embodiment utilizing one of the foregoing NICs, hypervisor 112 associates each instantiated virtual machine on computer system 100 with a dedicated physical queue or function in NIC 108 such that each virtual machine can utilize the "zero-copy" techniques (i.e., assigning an address in step 910 rather than copying data in step 510) as detailed in FIGS. 7-12 and descriptions corresponding thereto. FIG. 13 depicts an embodiment of computer system 100 with a multi-queue NIC 108 as well as multiple virtual machines $120_1$ to $120_n$. In the embodiment of FIG. 13, hypervisor 112 has configured NIC 108 such that its multiplexer 1200 is able to forward incoming network data to a queue $120_1$ to $120_n$ that corresponds to virtual machines $120_1$ to $120_n$. Because the incoming data packets are funneled to the correct virtual machine, hypervisor 112 is able to support multiple descriptor rings $200_1$ to $200_n$ that correspond to descriptors rings $400_1$ to $400_n$ of each virtual machine. As such, each virtual machine is able to implement the zero copy techniques described in FIGS. 7 through 12.

In a system supporting multiple virtual machines on a single computer system, "network" data communication among the various virtual machines is not received through hardware NIC 108 and therefore is not managed by device driver 116 or descriptor rings $200_1$ through $200_n$. Instead, data packets originating from one virtual machine are received by hypervisor 112 and forwarded to the VNIC of the intended virtual machine recipient. In one embodiment, descriptor ring $400_n$ is sized to be greater than descriptor ring $200_n$ (e.g., two to three times greater, etc.) in order to accommodate such "inter-VM" communications. By making the size of descriptor ring $400_n$ greater than descriptor ring $200_n$, descriptor ring $400_n$ can provide as many free buffer addresses to descriptor ring $200_n$ as descriptor ring $200_n$ can support (through steps 822 to 832 in FIG. 8) and still have left over free buffer addresses to support incoming inter-VM network data. Because inter-VM communication does not utilize descriptor ring $200_n$ (which is used to manage interaction between NIC 108 and device driver 136), the zero-copy techniques of FIG. 9 (i.e., step 910) that are used when network data intended for VM $120_n$ is received from NIC 108 are not used with inter-VM communication. Instead, when hypervisor 112 receive network data from another virtual machine on the same computer system, it utilizes the flow of FIG. 5 (steps 502 to 516, including the buffer copy of step 510) to process the data. It should be recognized that setting the size of descriptor ring $400_n$ greater than descriptor ring $200_n$ also reduces the risk that descriptor ring $200_n$ cannot obtain needed free buffer addresses from descriptor ring $400_n$ (in step 824) because all the addresses in descriptor ring $400_n$ are either owned by guest operating system 132 (e.g., being processed by the virtual machine in step 920 or yet "unfreed" through the batch process in steps 924 to 930) or owned by NIC 108 (e.g., "in flight" with data to the guest via steps 806 to 816 and 900 to 916 or already allocated to be used by NIC 108 via steps 822 to 832).

In an embodiment with a computer system 100 that has instantiated multiple virtual VMs that communicate with one another, the zero-copy techniques of FIGS. 7 through 12 are combined with the copy techniques of FIGS. 2 through 6 depending upon where the incoming data originates (i.e., from NIC 108 or via hypervisor 108 from another VM). FIGS. 14A to 14B are tables categorizing the different scenarios which may arise in such an embodiment and the course of action taken by hypervisor 112. FIG. 14A describes the various scenarios that occur when incoming network data is placed during DMA by NIC 108 into a buffer in guest operating system memory space 424. This occurs when zero-copy techniques are utilized and descriptor ring 200 is filled with addresses of guest operating system memory space 424 in steps 822 through 832 in FIG. 8 or 11. In such scenarios, the techniques of FIGS. 7 through 12 may be utilized when consumer pointer 408 points to a descriptor owned by NIC 108 or hypervisor 112 (see 1400 and 1405), except when in step 904, it is determined that consumer pointer 408 points to a descriptor that is owned by guest operating system 132. In such a situation, the data packet is dropped because descriptor ring 400 is at capacity and VNIC 128 cannot accept new data until it finished processing prior network data and frees up buffers through steps 822 to 832 (see 1410). In 1405, when the descriptor entry pointed to by consumer pointer 408 is owned by hypervisor 112, an alternative embodiment that does not utilize zero-copy techniques copies the data from the buffer written to by NIC 108 during DMA into the buffer address of the descriptor entry pointed to by consumer pointer 408. FIG. 14B describes the various scenarios that occur when incoming data originates from another virtual machine on computer system 100 via inter-VM communication. In such a scenario, descriptor ring 200 is not utilized to copy the incoming data into an available buffer in guest operating memory space 424. Instead hypervisor 112 utilizes buffers in its own hypervisor memory space 224 to store the incoming data (or, alternatively, keeps data stored in the transmitting virtual machines memory space) prior to informing guest operating system 132 to process the data. In such situations, when the descriptor pointed to by consumer pointer 408 is owned by NIC 108 or hypervisor 112, a copy step similar to step 510 is needed to copy to the guest operating system space 424 in order to enable guest operating system 132 to process the data (see 1415 and 1420). In 1425, if, however, the descriptor pointed to by consumer pointer 408 is owned by guest operating system 132, then descriptor ring 400 is at capacity and the data is dropped. The scenarios in FIG. 14B may also arise in situations other than inter-VM communication. For example, the scenarios in FIG. 14B may arise in a computer system has an additional physical NIC (e.g., for failover purposes, etc.) that receives data for VNIC 128 but that does not utilize zero-copy techniques.

Certain guest operating system events like suspend, reboot, moving the virtual machine operating the guest operating system to a different host, etc. require the guest operating system to reclaim buffers originating from its memory space 424 that have been allocated to hypervisor 112 and/or NIC 108. However, certain of such buffers may be participating in DMA at the NIC 108 level during zero-copying. To address such situations, in one embodiment, the performance of such events are delayed until hypervisor 112 requests NIC 108 to release all of the buffers of guest operating system 132 and repopulates them with buffers from hypervisor memory 224. In an alternative embodiment, where it may be less desirable to delay the execution of an event, such as in the instance of a reboot, pages of guest operating system's 132 memory space that contain buffer addresses that have been given to NIC 108 are replaced with new pages so that the memory space is not corrupted by DMA by NIC 108.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense. For example, alternative embodiments may circumvent the use of a descriptor ring by the VNIC to provide buffer availability information to the PNIC and/or data availability information to the guest operating system and instead utilizing the framework of APIs and the like to implement direct communication of such information to the appropriate entities. For example, while the foregoing discussions have generally discussed descriptor entries having "ownership" values, it should be recognized that such ownership values represent access control permissions among the various interacting components and that in alternative embodiments, the concept of ownership may not necessarily be implemented by changing a value in the descriptor. As previously discussed, for example, alternative embodiments may enable shared pointers between a producer entity and a consumer entity to assess the position of a descriptor in a descriptor ring relative to the producer and consumer pointers (or any other additional pointers that may be used). The position of a descriptor relative to such pointers can provide enough information to determine an ownership value and, similarly, the moving of such pointers can provide the mechanism through which ownership values are changed. Further, alternative naming conventions other than "ownership" may be utilized in alternative descriptions. For example, a descriptor entry in descriptor ring 400 that is "owned" by hypervisor 112 may be referred to as "available" or "not used" while a descriptor entry in descriptor ring 400 that is "owned" by NIC 108 may be "in use" or "used for zero-copy." It should also be recognized, for example, that addresses of buffers may be either virtual addresses or physical addresses and that translations may occur when providing an address from a guest operating system to a hardware NIC for DMA (or vice versa). As such, any reference herein to a particular address of a buffer may refer to either a virtual or physical representation of the address, as the context requires.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer system for transferring incoming network data to instantiated virtual machines, the computer system comprising:
 a network interface controller (NIC) that performs direct memory access (DMA);
 a processor programmed to execute a hypervisor software layer to instantiate virtual machines, wherein each virtual machine instantiated by the hypervisor software layer comprises a guest operating system; and
 a memory component comprising, for each instantiated virtual machine, (a) a first descriptor ring for providing addresses of buffers from a memory space of the guest operating system to the hypervisor software layer, wherein each entry of the first descriptor ring has an ownership value selected from a group consisting of the hypervisor software layer, the guest operating system and the NIC, and (b) a second descriptor ring for providing the addresses of buffers from the hypervisor software layer to the NIC.

2. The computer system of claim 1 wherein, for at least one instantiated virtual machine, the size of the first descriptor ring is greater than the size of the second descriptor ring.

3. The computer system of claim 1 wherein the memory component further comprises, for at least one instantiated virtual machine, a table containing addresses of free buffers from the memory space of the guest operating system.

4. The computer system of claim 1 wherein the NIC is configured to dedicate a queue to each instantiated virtual machine.

5. The computer system of claim 4 wherein the NIC is further configured to forward incoming network data directed to a given instantiated virtual machine to the virtual machine's dedicated queue.

6. The computer system of claim 1 wherein the memory component further comprises a memory space of buffers for use by the hypervisor software layer, wherein the buffers are written with data during communication between instantiated virtual machines.

7. The computer system of claim 1 wherein the NIC is configured to, at the time of receiving network data directed to an instantiated virtual machine:
    obtain, from the second descriptor ring, an address of a buffer in the memory space of the virtual machine's guest operating system; and
    write the network data directly into the buffer using DMA.

8. A method for transferring network data from a network interface controller (NIC) of a computer system to instantiated virtual machines, the NIC performing direct memory access (DMA), the method comprising:
    executing, by the computer system, a hypervisor software layer to instantiate virtual machines, wherein each virtual machine instantiated by the hypervisor software layer comprises a guest operating system; and
    for each instantiated virtual machine:
        providing, by the computer system via a first descriptor ring, addresses of buffers from a memory space of the guest operating system to the hypervisor software layer, wherein each entry of the first descriptor ring has an ownership value selected from a group consisting of the hypervisor software layer, the guest operating system and the NIC; and
        providing, by the computer system via a second descriptor ring, the addresses of buffers from the hypervisor software layer to the NIC.

9. The method of claim 8 wherein, for at least one instantiated virtual machine, the size of the first descriptor ring is greater than the size of the second descriptor ring.

10. The method of claim 8 wherein the computer system is configured to maintain, for at least one instantiated virtual machine, a table containing addresses of free buffers from the memory space of the guest operating system.

11. The method of claim 8 wherein the NIC is configured to dedicate a queue to each instantiated virtual machine.

12. The method of claim 11 wherein the NIC is further configured to forward incoming network data directed to a given instantiated virtual machine to the virtual machine's dedicated queue.

13. The method of claim 8 wherein the computer system is configured to maintain a memory space of buffers for use by the hypervisor software layer, wherein the buffers are written with data during communication between instantiated virtual machines.

14. The method of claim 8 wherein the NIC is configured to, at the time of receiving network data directed to an instantiated virtual machine:
    obtain, from the second descriptor ring, an address of a buffer in the memory space of the virtual machine's guest operating system; and
    write the network data directly into the buffer using DMA.

15. A non-transitory computer readable storage medium having stored thereon a computer program for transferring network data from a network interface controller (NIC) of a computer system to instantiated virtual machines, the NIC performing direct memory access (DMA), where the computer system executes the computer program to carry out the steps of:
    executing a hypervisor software layer to instantiate virtual machines, wherein each virtual machine instantiated by the hypervisor software layer comprises a guest operating system; and
    for each instantiated virtual machine:
        providing, via a first descriptor ring, addresses of buffers from a memory space of the guest operating system to the hypervisor software layer, wherein each entry of the first descriptor ring has an ownership value selected from a group consisting of the hypervisor software layer, the guest operating system and the NIC; and
        providing, via a second descriptor ring, the addresses of buffers from the hypervisor software layer to the NIC.

16. The non-transitory computer readable storage medium of claim 15 wherein, for at least one instantiated virtual machine, the size of the first descriptor ring is greater than the size of the second descriptor ring.

17. The non-transitory computer readable storage medium of claim 15 wherein the computer system is configured to maintain, for at least one instantiated virtual machine, a table containing addresses of free buffers from the memory space of the guest operating system.

18. The non-transitory computer readable storage medium of claim 15 wherein the NIC is configured to dedicate a queue to each instantiated virtual machine.

19. The non-transitory computer readable storage medium of claim 18 wherein the NIC is further configured to forward incoming network data directed to a given instantiated virtual machine to the virtual machine's dedicated queue.

20. The non-transitory computer readable storage medium of claim 15 wherein the computer system is configured to maintain a memory space of buffers for use by the hypervisor software layer, wherein the buffers are written with data during communication between instantiated virtual machines.

21. The non-transitory computer readable storage medium of claim 15 wherein the NIC is configured to, at the time of receiving network data directed to an instantiated virtual machine:
    obtain, from the second descriptor ring, an address of a buffer in the memory space of the virtual machine's guest operating system; and
    write the network data directly into the buffer using DMA.

* * * * *